US008279977B2

(12) United States Patent
Rayala (10) Patent No.: US 8,279,977 B2
(45) Date of Patent: Oct. 2, 2012

(54) MIMO SIGNAL DETECTOR, A METHOD OF DETECTING MIMO SIGNALS AND A MIMO RECEIVER

(75) Inventor: Jitendra Rayala, Sunnyvale, CA (US)

(73) Assignee: Verisilicon, Santa Clara, CA (US)

( * ) Notice: Subject to any disclaimer, the term of this patent is extended or adjusted under 35 U.S.C. 154(b) by 107 days.

(21) Appl. No.: 12/967,925

(22) Filed: Dec. 14, 2010

(65) Prior Publication Data

US 2012/0147945 A1 Jun. 14, 2012

(51) Int. Cl.
*H03K 9/00* (2006.01)
*H04L 27/00* (2006.01)

(52) U.S. Cl. .......... 375/316; 375/262; 375/341; 341/79; 714/794; 714/795

(58) Field of Classification Search .................. 375/316, 375/340–341, 347, 262, 265, 267; 341/79; 714/786, 792, 794–796
See application file for complete search history.

(56) References Cited

U.S. PATENT DOCUMENTS

| 8,059,761 | B2 * | 11/2011 | Amiri et al. | 375/340 |
| 2008/0153444 | A1 * | 6/2008 | Chen et al. | 455/205 |
| 2009/0063106 | A1 * | 3/2009 | Burg et al. | 703/2 |
| 2010/0040177 | A1 * | 2/2010 | Dick et al. | 375/341 |
| 2010/0074375 | A1 * | 3/2010 | Chen et al. | 375/340 |
| 2010/0074376 | A1 * | 3/2010 | Chen et al. | 375/340 |
| 2010/0157785 | A1 * | 6/2010 | Song et al. | 370/203 |
| 2010/0329395 | A1 * | 12/2010 | Kang et al. | 375/341 |

OTHER PUBLICATIONS

Tulino Atonia M., "Random Matrix Theory and Wireless Communications," Now Publications Inc., Hanover, MA., 2004, p. 20.
Tse David and Pramod Viswanath, "Fundamentals of Wireless Communication," Cambridge University Press, Cambridge, New York, 2005, pp. 354-355 and 368-369.
Yi Jiang and Xiayu Zheng and Jian Li, "Asymptotic Performance Analysis of V-BLAST," IEEE Global Comm. Conf. 2005, pp. 3882-3886.
Loyka, et al.; Performance Analysis of the V-BLAST Algorithm: An Analytical Approach; pp. 1326-1337; IEEE Jul. 2004.
Bengough, et al.; Sorting-Based VLSI Architectures for the M-Algorithm and T-Algorithm Trellis Decoders; pp. 514-522; IEEE Feb., Mar., Apr. 1995.
Pons, et al.; New Approaches for Lowering Path Expansion Complexity of K-BEST MIMO Detection Algorithms; 6 Pages; IEEE 2009.
Shen et al.; A Radius Adaptive K-BEST Decoder With Early Termination: Algorithm and VLSI Architecture; pp. 2476-2486; IEEE Sep. 2010.
Wenk, et al; K-BEST MIMO Detection VLSI Architectures Achieving up to 424 Mbps; pp. 1151-1154; IEEE 2006.
Wu, et al.; Early-Pruned K-BEST Sphere Decoding Algorithm Based on Radius Constraints; pp. 4496-4500; IEEE 2008.
Agrell, et al.; Closest Point Search in Lattices; pp. 2201-2214; IEEE Aug. 2002.
Barbero, et al.; Fixing the Complexity of the Sphere Decoder for MIMO Detection; pp. 2131-2142; IEEE Jun. 2008.

(Continued)

*Primary Examiner* — Jean B Corrielus (57) ABSTRACT

A signal decoder, a method of detecting an RF signal at a MIMO receiver and a MIMO receiver are disclosed herein. In one embodiment, the signal decoder includes: (1) a tree pruner configured to reduce a number of nodes of an MLD tree to expand based on modulation properties of the transmitted radio signals and SE enumeration of at least a portion of the MLD tree and (2) a vector sorter configured to sort multiple rows of child nodes of the MLD tree in parallel.

21 Claims, 4 Drawing Sheets

OTHER PUBLICATIONS

Damen, et al.; On Maximum-Likelihood Detection and the Search for the Closest Lattice Point; pp. 2389-2402; IEEE Oct. 2003.

Calcev, et al.; A Wideband Spatial Channel Model for System-Wide Simulations; pp. 389-403; IEEE Mar. 2007.

Detert; An Efficient Fixed Complexity QRD-M Algorithm for MIMO-OFDM Using Per-Survivor Slicing; pp. 572-576; IEEE 2007.

Wubben, et al.; MMSE Extension of V-BLAST Based on Sorted QR Decomposition; pp. 508-512; IEEE 2003.

Ketonen, et al.; Performance—Complexity Comparison of Receivers for LTE MIMO—OFDM System; pp. 3360-3372; IEEE Jun. 2010.

Wiesel, et al.; Efficient Implementation of Sphere Demodulation; pp. 36-40; IEEE 2003.

Kerttula, et al.; Word Length Study and Architecture Design of a K-BEST Based MIMO-OFDM Detector Algorithm; 5 Pages; IEEE 2007.

Wong, et al; A VLSI Architecture of a K-BEST Lattice Decoding Algorithm for MIMO Channels; pp. 273-276; IEEE 2002.

Baum, et al.; An Interim Channel Model for Beyond-3G Systems; 5 Pages; IEEE 2005.

\* cited by examiner

MIMO SIGNAL DETECTOR, A METHOD OF DETECTING MIMO SIGNALS AND A MIMO RECEIVER

TECHNICAL FIELD

This application is directed, in general, to Multiple-input and multiple-output (MIMO) communications systems and, more specifically, to decoding received RF signals at MIMO receivers.

BACKGROUND

MIMO communications systems use multiple antennas for both transmitting and receiving to improve communication performance. In MIMO wireless communication systems, a transmission technique known as spatial multiplexing is used to transmit independent and separately encoded data signals (i.e., data streams) from each of the multiple transmit antennas. Decoding the received data at MIMO receivers can be challenging. As such, multiple decoding algorithms with different complexity-performance tradeoffs can be used.

The Maximum Likelihood Detector (MLD) Real Model is an example of a decoding algorithm that can be used at a MIMO receiver to detect transmitted symbols from a MIMO transmitter. To detect a transmitted symbol, an MLD tree may be generated and searched to find the node having the minimum Partial Euclidean Distance (PED). The node with the PED is selected as the estimate of the transmitted symbol from the received symbol.

Instead of searching the entire MLD tree, different schemes have been used to reduce the search space by imposing constraints. As such, different search strategies, such as, depth first and breadth first, have been used. One type of breadth first search strategy is a K-Best/QR decomposition (QRD)-M Tree Search scheme. The basic idea for this tree search scheme is at each level of the MLD tree, a decoder will sort and keep only K nodes with the minimum PED and discard the rest before proceeding to the next level. The decoder utilizing a K-Best search scheme always works in a feed-forward fashion. That is, when processing at a given level, it does not traverse back to any previous levels. At the next level, only the survived K nodes are expanded from the previous level till the leaf nodes are reached. The decoder then searches for the node with minimum PED among the leaf nodes resulting in a pseudo ML solution without the calculation complexity of the MLD.

Various versions of the K-Best strategy, therefore, have been used when detecting received data to reduce the number of calculations needed but still maintain sufficient results. However, in order to support higher order modulations such as 64-QAM or 256-QAM, a higher value of K is needed in order to get a Bit Error Rate (BER) performance that can approach that of MLD. For example, a higher value of K=16 can be used to support these modulations.

SUMMARY

One aspect of the disclosure provides a signal decoder configured to estimate transmitted radio signals from a plurality of received radio signals. In one embodiment, the signal decoder includes: (1) an in-advance tree pruner configured to reduce a number of child nodes of an MLD tree to expand in parallel based on properties of SE enumeration and modulation properties of said received radio signals and (2) a vector sorter configured to sort multiple rows of the expanded child nodes of the MLD tree in parallel.

In another aspect, a method of detecting received RF signals at a MIMO receiver is disclosed. The method includes: (1) generating at least part of a Maximum Likelihood Detector (MLD) tree for detecting a radio frequency signal at the MIMO receiver, (2) pruning the MLD tree to reduce the number of child nodes thereof and to expand in parallel based on modulation properties of the radio frequency signal and SE enumeration, (3) sorting multiple rows of child nodes of the MLD tree in parallel and (4) selecting a node of the MLD tree having a minimum PED as an estimate of the radio frequency signal.

In yet another aspect, a MIMO receiver is disclosed. In one embodiment, the MIMO receiver includes: (1) a plurality of antennas configured to receive a plurality of received radio signals and (2) a signal decoder configured to estimate transmitted radio signals from the plurality of received radio signals, the signal decoder having: (2A) an in-advance tree pruner configured to reduce a number of child nodes of an MLD tree and to expand said reduced number of child nodes in parallel based on properties of SE enumeration and modulation properties of said received radio signals and (2B) a vector sorter configured to sort multiple rows of the expanded child nodes of the MLD tree in parallel.

BRIEF DESCRIPTION

Reference is now made to the following descriptions taken in conjunction with the accompanying drawings, in which.

DETAILED DESCRIPTION

Employing a higher value of K in K-Best schemes increases the computational complexity of the decoder. In conventional K-Best schemes, the complexity is essentially from two components, the child node expansion and sorting. In some of the conventional K-Best schemes, all the child nodes of each survived parent node are expanded where as in others they are expanded sequentially. Many of the schemes also use traditional sorting algorithms which are primarily sequential in nature. All these aspects add to the complexity as well as latency and do not provide an easy method to implement using vector engines.

The basic idea with a K-Best search scheme, such as the K-Best/QR decomposition (QRD)-M Tree Search scheme, is to sort and keep K nodes with the minimum PED at each level of the tree and discard the rest until the node of the MLD tree with the minimum PED is located. This disclosure demonstrates how to further reduce the number of computations needed for detecting a transmitted signal by pruning the number of child nodes in-advance that need to be expanded at each level. For example, in one embodiment, only the child nodes that are determined in-advance are expanded. This in-advance pruning reduces the complexity of node expansion considerably. Additionally, the disclosure provides how to parallelize sorting of the tree levels using vector sorting. As disclosed herein, the sorting can be parallelized using properties of Schnorr-Euchner (SE) enumeration, index augmented vector compare-exchange operations and vector rotations resulting in vector sorting employing a vector engine based sorting algorithm. SE enumeration is an example of a conventional enumeration scheme used with K-Best algorithms. Hence, the disclosure provides a method that simultaneously reduces the number of child node expansions while expanding them in parallel and performs sorting of these vectors using vector engines.

The in-advance pruning K-Best MIMO detection scheme disclosed herein provides pruning computations using properties of the channel and feedback equalization with SE enumeration, employing vectors for PED calculations (i.e., node expansions) using SE enumeration and vector sorting. By employing vectors for node expansions and sorting, a higher order vector engine, such as a SIMD, can be used allowing efficient programmable implementations. Thus, detecting transmitted symbols in a MIMO communications system employing both in-advance child node pruning and vector sorting with the ability to automatically keep track of the survived nodes is disclosed.

Figure 1:
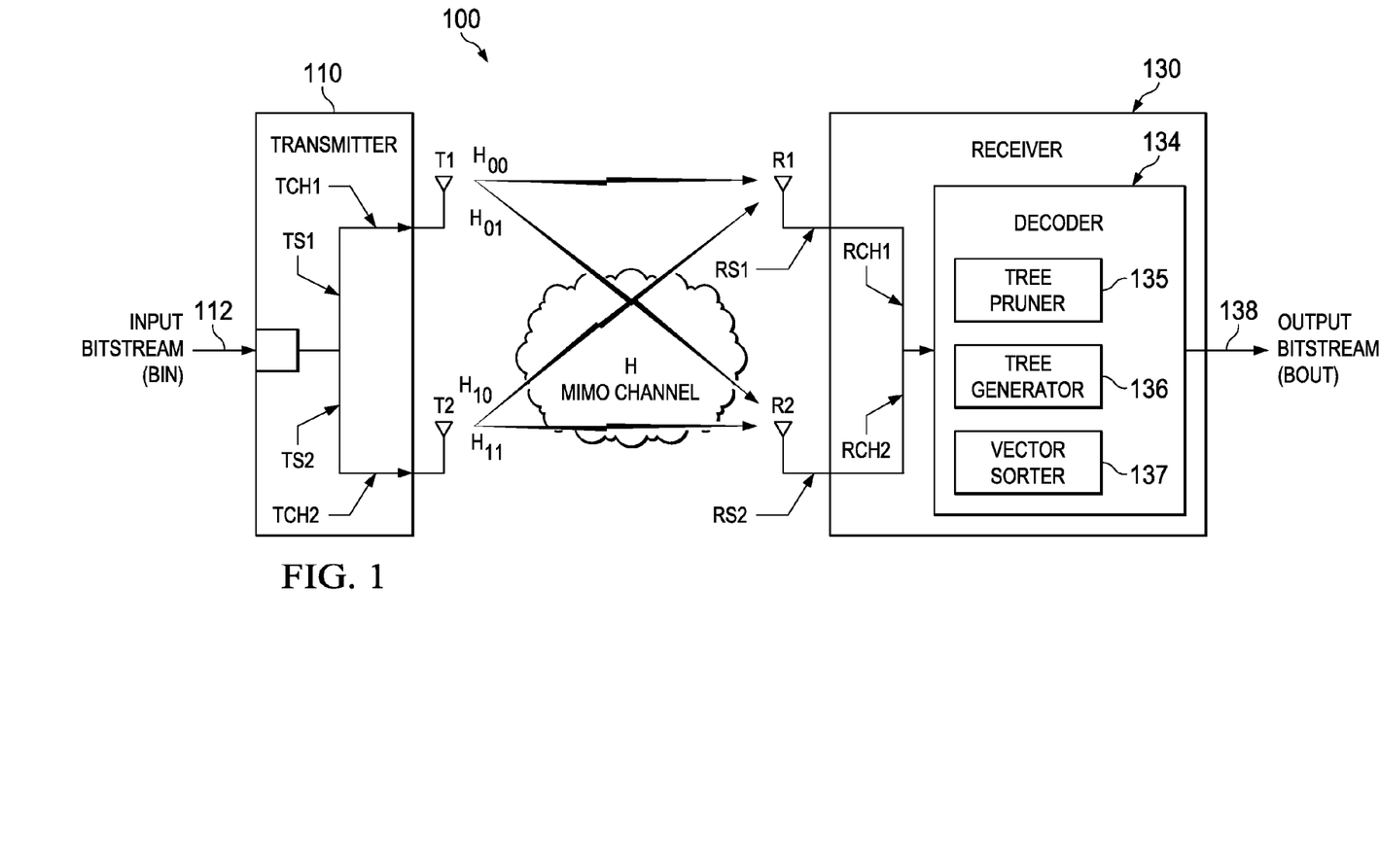
FIG. 1 is a block diagram of an embodiment of a MIMO communication system constructed according to the principles of the disclosure.

FIG. 1 is a block diagram of an embodiment of a MIMO communication system 100 constructed according to the principles of the disclosure. The MIMO communication system 100 includes a MIMO transmitter 110 and a MIMO receiver 130. The MIMO transmitter 110 includes a transmit input 112 having an input bitstream Bin and a transmit system having first and second transmit channels TCH1, TCH2, that couple first and second transmit substreams TS1, TS2 to first and second transmit antennas T1, T2, respectively. The MIMO receiver 130 includes first and second receive antennas R1, R2, that respectively couple first and second receive substreams RS1, RS2 to first and second receive channels RCH1, RCH2 of a receive system and a receive decoder 134 that provides an output bitstream Bout 138.

The first and second transmit channels TCH1, TCH2 include the frequency tuning, modulation and power amplification circuitry required to condition and transmit the first and second transmit substreams TS1, TS2. The first and second receive channels RCH1, RCH2 contain the required capture, detection and recovery circuitry to allow processing of the first and second receive substreams RS1, RS2 into a symbol configuration that may be employed by the receive decoder 134. The receive decoder 134 decodes the first and second receive streams RS1, RS2 into the output bitstream Bout 138 that is representative of the input bitstream Bin 112. One skilled in the art will understand the operation and configuration of the transmit channels and the receive channels.

The decoder 134 is configured to detect a transmitted symbol based on received symbols for each data sub-carrier. The decoder 134 includes a tree pruner 135, tree generator 136, and a vector sorter 137. In one embodiment, the decoder 134 may be implemented as a SIMD device. Other computing devices may also be used. In another embodiment, the decoder 134 may be implemented as a computing device having multiple DSP cores.

The tree pruner 135 is configured to reduce the number of computations needed to expand the child nodes in-advance of the K-Best MLD tree. The tree pruner 135 is configured to prune the tree employing properties of SE enumeration and modulation properties including decision feedback equalization. For example, in order to arrive at the number of nodes to prune in-advance, consider a MIMO system with N number of transmit or receive antennas. Then the real channel matrix of MIMO the system will be of the size 2N×2N. Let $H_r$, $r_r$ and $s_r$ be the real channel matrix, received signal, and the transmitted symbol, respectively. Then an optimum detector for detecting the transmitted symbols $s_r$ under additive noise is the Maximum Likelihood Detector (MLD) as reflected in Equation 1.

$$\hat{s}_r = \arg\min_{s_r \in S_r} |r_r - H_r s_r|^2 \quad \text{(Equation 1)}$$

The Channel Matrix H may be factorized using real valued QR Decomposition as $H_r = Q_r R_r$, where $Q_r$ is a real valued orthogonal matrix and $R_r$ is a real valued upper triangular matrix. With this factorization, the above equation (Equation 1) can be transformed to Equation 2

$$\hat{s}_r = \arg\min_{s_r \in S_r} |\hat{r}_r - R_r s_r|^2 \quad \text{(Equation 2)}$$

Where $\hat{r}_r = Q_r^H r_r$. As an example consider a case of N=2 then the detection can be written in matrix form as $$\begin{bmatrix} e_0 \\ e_1 \\ e_2 \\ e_3 \end{bmatrix} = \begin{bmatrix} \hat{r}_0 \\ \hat{r}_1 \\ \hat{r}_2 \\ \hat{r}_3 \end{bmatrix} - \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} s_0 \\ s_1 \\ s_2 \\ s_3 \end{bmatrix} \quad \text{(Equation 3)}$$

Let A be the number of real constellation points or symbols in the modulation scheme. For example, with QAM-64 modulation, A=8. The MIMO detection using K-Best tree for the case N=2 search starts at the fourth row (each row is also referred henceforth as layer) in the above equation and proceeds till it reaches the first layer. At each layer, PED is calculated for all possible transmitted symbols for each of the survived nodes from previous layer, sorted and K nodes are kept. In the general case on N transmit and receive antennas, the search starts at the $2N^{th}$ row and proceeds to the first row. The complexity of K-Best will be as shown in the table below:

TABLE 1

K-Best Complexity without in-advance pruning
K-Best Complexity

| Tree Level | Expansions | Sorting |
|---|---|---|
| 4 | A | Sort A PED values |
| 3 | A*A | Sort A*A PED values and choose minimum K |
| 2 | A*K | Sort K*A PED values and choose minimum K |
| 1 | A*K | Find minimum of K PED values. |

As an example, for QAM-64 modulation, without pruning K-Best method with K=16 requires 328 child node expansions. The in-advance tree pruner 135 further reduces this complexity using the properties of decision feedback equalization and SE enumeration.

One skilled in the art will understand that the spatial MIMO Channel follows Rayleigh Fading. As such, the channel matrix for any sub-carrier in OFDM MIMO communications system will be Multivariate Gaussian wherein each element of the channel matrix will be Gaussian distributed. Let i denote the layer. Based on random matrix properties, the non-diagonal elements of upper triangular matrix $R_r$ and the errors $e_i$ will be Gaussian distributed and the diagonal elements of the upper triangular matrix $R_r$ and the PED will be Chi-square distributed. Now as part of tree search, at each layer, the contribution from the already detected symbols corresponding to the survived parent nodes is successively cancelled. This decision feedback equalization reduces the interference from previous layers. Based on the earlier property of random matrices and this successive interference reduction, the diversity gain at each layer will be (2N−i+1) and the average probability of error at each layer will be inversely proportional to Signal to Noise Ratio (SNR) given by the following equation known in the art:

$$P_i \propto SNR^{-(2N-i+1)} \quad \text{(Equation 4)}$$

That means as the detection proceeds from layer 2N to layer 1, the diversity gain increases and average probability of error reduces. Using this property that the average probability of error reduces going from higher to lower layers, the PED can be constrained and those nodes to be expanded can be limited to only those nodes that are less than some PED. In order to put a limit on PED, at any layer i, the child nodes to be expanded may only be the child nodes whose PED is constrained to be less than the maximum of PED of all the survived parent nodes at layer i+1. If $d_i^c$ is the PED of a child node at layer i and $d_{i+1}^P$ p=0 ... K are the PEDs of the survived parent nodes at layer i+1, then the child nodes to expand may only be those child nodes that satisfy the relation:

$$d_i^c < \max(d_{i+1}^0 \ldots d_{i+1}^K) \quad \text{(Equation 5)}$$

Figure 2:
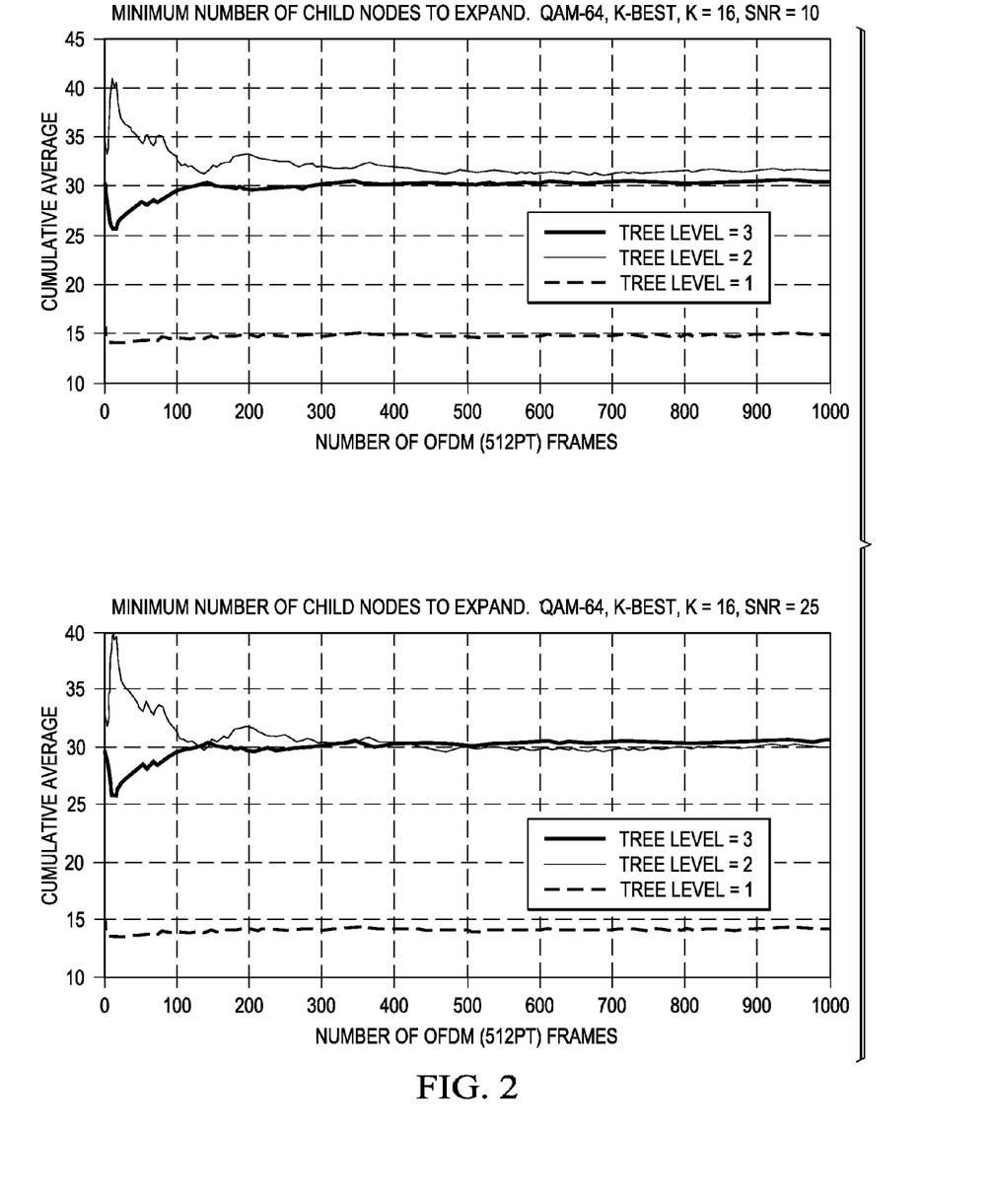
FIG. 2 illustrates graphs representing simulations, for a SNR of 10 and a SNR of 25, demonstrating the minimum number of child nodes to expand based on a constraint on the PED.

FIG. 2 illustrates the average number of child nodes that satisfy the above constraint for QAM-64 modulation with K=16 and at different SNRs based on the results of MIMO simulations. It can be observed that at layer 3, 32 child nodes can be expanded out of 64, and at layer 2, 32 child nodes can be expanded out of 128 and at layer 1, 16 child nodes can be expanded out of 128 nodes. As such, at every layer, the number of nodes to expand reduces in geometric progression until a layer is reached where the number of child nodes being expanded is equal to K. Thereafter only K number of child nodes may be expanded. If $n_i$ is the minimum number of child nodes to expand at layer i then it is given by $$n_{2N} = A \quad \text{(Equation 6)}$$
$$n_{2N-1} = \max\left(\frac{A}{2}A, K\right)$$
$$n_i = \max\left(\frac{A}{2^{2N-i}}K, K\right) \quad (2N-2) \geq i \geq 1$$

Based on this, for the example of two transmit and receive antennas (N=2) and QAM-64 modulation with K=16, the number of child nodes to expand is as shown in Table 2.

TABLE 2

| \multicolumn{2}{c}{Number of Child Nodes to Expand after Pruning} | |
| --- | --- |
| Tree Level | Number of child Nodes to expand |
| 4 | 8 |
| 3 | 32 |
| 2 | 32 |
| 1 | 16 |

Based on Table 2, the number of child nodes to expand for the example of QAM-64, K=16, N=2 case, are reduced from 328 (for the original K-Best) to 88 which represents a significant reduction of 75%.

Accordingly, the number of child nodes to expand at each layer can be determined. Additionally, which ones of the child nodes to expand out of the total nodes at each layer needs to be determined. For example, for the QAM-64, K=16 case, at layer 3 the 32 child nodes to expand of the total 64 nodes have to be determined. Using the properties of SE enumeration, these nodes may be automatically determined without expanding each child node sequentially and determine if it satisfies the constraint on PED. If we were to expand sequentially, it would actually defeat the whole exercise of reducing the number of nodes to expand and to do it in parallel.

In order to arrive at a method to determine which child nodes to expand in parallel, consider Table 3 that shows all the expanded child nodes and their PED at layer 3 using SE enumeration for the QAM-64, K=16, N=2 example used in the simulations. Since A=8, at this layer, there are 64 total nodes. However in order to prune, it is desired to expand only 32 of the total 64 nodes. In Table 3, each column corresponds to PED of child nodes for one survived parent node from layer 4. Table 3 shows that each column is already ordered with increasing order of PED according to SE enumeration. Since the column having the lowest PED can not be deduced, the child nodes that need to be expanded are uniformly allocated to all the survived parent nodes. As such, because the PED are ordered with increasing PED, out of 32 child nodes, 4 child nodes with the lowest PED in each column can be assigned to the respective parent node. Accordingly, only the first four rows in the PED matrix may need to be expanded (i.e., the other 4 rows do not have to be expanded) and these can be expanded in parallel.

TABLE 3

| 8 × 8 PED Matrix | | | | | | | | | |
| --- | --- | --- | --- | --- | --- | --- | --- | --- | --- |
| | | Parent Nodes | | | | | | | |
| | | 0 | 1 | 2 | 3 | 4 | 5 | 6 | 7 |
| Child Nodes | 0 | 0.0098 | 0.1941 | 0.402 | 2.1955 | 6.0958 | 12.103 | 20.2171 | 30.438 |
| | 1 | 0.7153 | 0.9186 | 1.208 | 4.513 | 9.9248 | 17.4436 | 27.0691 | 38.8015 |
| | 2 | 0.7969 | 0.9621 | 3.5065 | 8.323 | 15.2464 | 24.2766 | 35.4137 | 48.6576 |
| | 3 | 3.0764 | 3.1355 | 7.2976 | 13.6256 | 22.0604 | 32.6021 | 45.2507 | 60.0061 |
| | 4 | 6.8484 | 3.2226 | 12.5811 | 20.4206 | 30.367 | 42.4202 | 56.5803 | 72.8472 |
| | 5 | 12.113 | 6.9757 | 19.3572 | 28.7082 | 40.166 | 53.7308 | 69.4023 | 87.1808 |
| | 6 | 18.8701 | 12.2213 | 27.6257 | 38.4882 | 51.4576 | 66.5338 | 83.7169 | 103.0068 |
| | 7 | 27.1196 | 18.9593 | 37.3868 | 49.7608 | 64.2417 | 80.8294 | 99.524 | 120.3254 |

Since at layer 2, there are 16 parent nodes and 32 child nodes to expand, two child nodes with the lowest PED in each column are assigned to the respective parent node. In the same way, one child node with the lowest PED in each column is assigned to the respective parent node in layer 1. That means at each layer, the number of child nodes per parent node is reduced in geometric progression till a layer is reached where the number of child nodes per parent is equal to 1. Thereafter, only 1 child per parent will need to be expanded. If $p_i$ is the number of child nodes assigned per parent at layer i then it is given by $$p_i = \max\left(\frac{A}{2^{2N-i}}, 1\right) \quad \text{(Equation 7)}$$

Based on this, for the example of QAM-64, N=2, the number of child nodes to expand per each parent is as shown in Table 4.

TABLE 4

Number of Child Nodes to Expand per Parent node

| Tree Level | Number of child nodes per parent |
|---|---|
| 4 | 8 |
| 3 | 4 |
| 2 | 2 |
| 1 | 1 |

Continuing with our example of QAM-64, K=16 and N=2, each parent node coming from layer 4 is expanded into 8 child nodes using SE enumeration. By expanding only the first four rows i.e., 4×A=32 from Table 2 for layer 3 would result in 32 values. Out of 32, K=16 surviving nodes need to be chosen. Since K=16, four rows of the matrix can be expanded and two rows can be packed into one 16 element vector.

Figure 4:
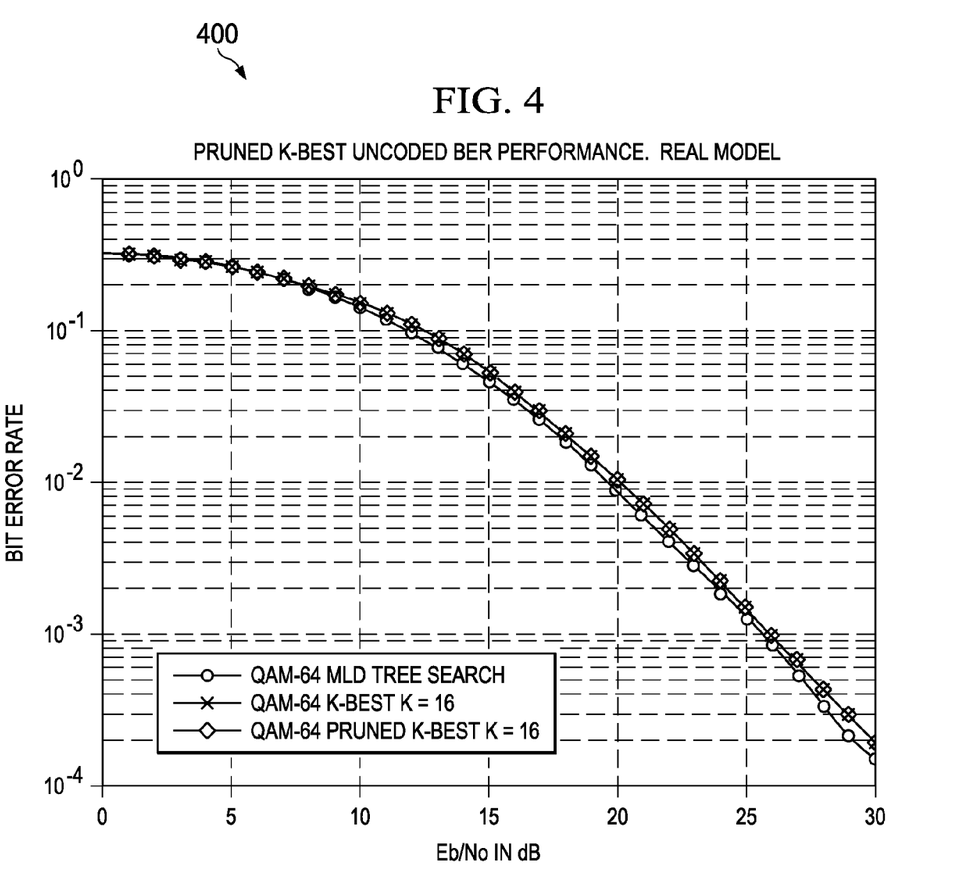
FIG. 4 illustrates a graph representing a simulation demonstrating the performance of in-advance pruning an MLD tree as disclosed herein.

At tree level 2, expanding only the first two rows results in 16×2 or 32 expansions. Again K=16 surviving nodes need to be chosen out of 32. Since K=16, each row can be maintained in a 16-element vector. Considering tree Level 1, expanding only one row results in 16 expansions. Choosing the minimum of these 16 elements provides a quasi-ML solution. Employing K=16 allows all the elements of a row to be expanded in parallel with, for example, a 16-way SIMD operations. FIG. 4 provides a graph representing simulation results employing the pruning as described above. FIG. 4 shows the BER performance of MLD and K-Best with K=16 for 64-QAM modulation. As illustrated, using K-Best with K=16 incurs only a minor loss of performance compared to MLD. Additionally, FIG. 4 also illustrates employing a K-Best algorithm with pruning as disclosed herein compares favorably with a Real MLD tree search.

The tree generator 136 generates the nodes of the tree by expanding the child nodes of the surviving parent nodes using SE enumeration. The number of child nodes that the tree generator 136 expands may be determined by the tree pruner 135 in-advance. Thus, in some embodiments the tree generator 136 will expand only those child nodes that the tree pruner 135 determines to expand.

The vector sorter 137 is configured to sort child nodes of the MLD tree in parallel using vector operations. Consider Table 3 as an example of sorting four, 8 element vectors to obtain nodes with the 16 minimum PED. In Table 3, wherein three rows are presented below, d0-d3 represent rows 0, 1, 2 and 3 of Table 2 with d0 and d1 representing first two row vectors. As mentioned earlier, by employing SE enumeration, the columns are already ensured to be sorted. To find the eight minimum PED values, each element of d0 has to be compared with every element of d1, d2 and d3.

A Section of Table 3: Three rows of the above 8 × 8 PED Matrix

|    | 0 | 1 | 2 | 3 | 4 | 5 | 6 | 7 |
|---|---|---|---|---|---|---|---|---|
| d0 | 0.0098 | 0.1941 | 0.402 | 2.1955 | 6.0958 | 12.103 | 20.2171 | 30.438 |
| d1 | 0.7153 | 0.9186 | 1.208 | 4.513 | 9.9248 | 17.4436 | 27.0691 | 38.8015 |
| d2 | 0.7969 | 0.9621 | 3.5065 | 8.323 | 15.246 | 24.2766 | 35.4137 | 48.6576 |

The vector sorter 137 is a vector compare and exchange engine that compares the eight elements of d0 and d1 in parallel. The vector sorter 137 then rotates d0 and compares with d1 as many times as needed to locate the eight minimum PED values among d0 and d1. To get eight values, the vector sorter 137 rotates d0 and performs vector compare and exchange operation eight times. The vector sorter 137 repeats the same with d2 and d3 to get the eight minimum PED among 32 values. Thus, with just 24 vector operations, the vector sorter 137 can find the best 8 (i.e., the eight minimum PED values) out of the 32 PED values. Table 5 represents the three rows after the first left vector rotation and Table 6 represents the three rows after the first compare and exchange operation.

TABLE 5

The Rows of Table 3 after First Left Vector Rotation

|   | 0 | 1 | 2 | 3 | 4 | 5 | 6 | 7 |
|---|---|---|---|---|---|---|---|---|
| 0 | 0.1941 | 0.402 | 2.1955 | 6.0958 | 12.103 | 20.2171 | 30.438 | 0.0098 |
| 1 | 0.7153 | 0.9186 | 1.208 | 4.513 | 9.9248 | 17.4436 | 27.0691 | 38.8015 |
| 2 | 0.7969 | 0.9621 | 3.5065 | 8.323 | 15.2464 | 24.2766 | 35.4137 | 48.6576 |

TABLE 6

The Rows of Table 5 after First Compare and Exchange

|   | 0 | 1 | 2 | 3 | 4 | 5 | 6 | 7 |
|---|---|---|---|---|---|---|---|---|
| 0 | 0.1941 | 0.402 | 1.208 | 4.513 | 9.9248 | 17.4436 | 27.0691 | 0.0098 |
| 1 | 0.7153 | 0.9186 | 2.1955 | 6.0958 | 12.103 | 20.2171 | 30.438 | 38.8015 |
| 2 | 0.7969 | 0.9621 | 3.5065 | 8.323 | 15.2464 | 24.2766 | 35.4137 | 48.6576 |

At each level of the tree, along with finding the best PED values, the vector sorter 137 also has to obtain the symbols corresponding to the survived child and the parent nodes. To track the survived child and parent nodes, the vector sorter 137 augments the PED vectors with index vectors which are simultaneously modified during the rotation and compare-exchange operation. With this, the indices of the survived child and parent nodes are readily available once the best PEDs are obtained. Tables 7-9 represent the PED vectors of Table 3 that are augmented with the index vectors. Rows 0 and 2 correspond to the PED values of rows d0 and d1 of Table 3. The corresponding indexes are in rows 1 and 3 of Table 7. Table 8 represents Table 7 after the first left vector rotation. Table 9 represents Table 8 after the first compare and exchange operation.

TABLE 7

Two Rows of A PED Matrix with corresponding Index

|   | 0 | 1 | 2 | 3 | 4 | 5 | 6 | 7 |
|---|---|---|---|---|---|---|---|---|
| 0 | 0.0098 | 0.1941 | 0.402 | 2.1955 | 6.0958 | 12.103 | 20.2171 | 30.438 |
| 1 | 0 | 1 | 2 | 3 | 4 | 5 | 6 | 7 |
| 2 | 0.7153 | 0.9186 | 1.208 | 4.513 | 9.9248 | 17.4436 | 27.0691 | 38.8015 |
| 3 | 8 | 9 | 10 | 11 | 12 | 13 | 14 | 15 |

TABLE 8

The PED Matrix With Index After First Vector Rotation

|   | 0 | 1 | 2 | 3 | 4 | 5 | 6 | 7 |
|---|---|---|---|---|---|---|---|---|
| 0 | 0.1941 | 0.402 | 2.1955 | 6.0958 | 12.103 | 20.2171 | 30.438 | 0.0098 |
| 1 | 1 | 2 | 3 | 4 | 5 | 6 | 7 | 0 |
| 2 | 0.7153 | 0.9186 | 1.208 | 4.513 | 9.9248 | 17.4436 | 27.0691 | 38.8015 |
| 3 | 8 | 9 | 10 | 11 | 12 | 13 | 14 | 15 |

TABLE 9

The PED Matrix After First Compare-Exchange Operation

|   | 0 | 1 | 2 | 3 | 4 | 5 | 6 | 7 |
|---|---|---|---|---|---|---|---|---|
| 0 | 0.1941 | 0.402 | 1.208 | 4.513 | 9.9248 | 17.4436 | 27.0691 | 0.0098 |
| 1 | 1 | 2 | 10 | 11 | 12 | 13 | 14 | 0 |
| 2 | 0.7153 | 0.9186 | 2.1955 | 6.0958 | 12.103 | 20.2171 | 30.438 | 38.8015 |
| 3 | 8 | 9 | 3 | 4 | 5 | 6 | 7 | 15 |

Figure 3:
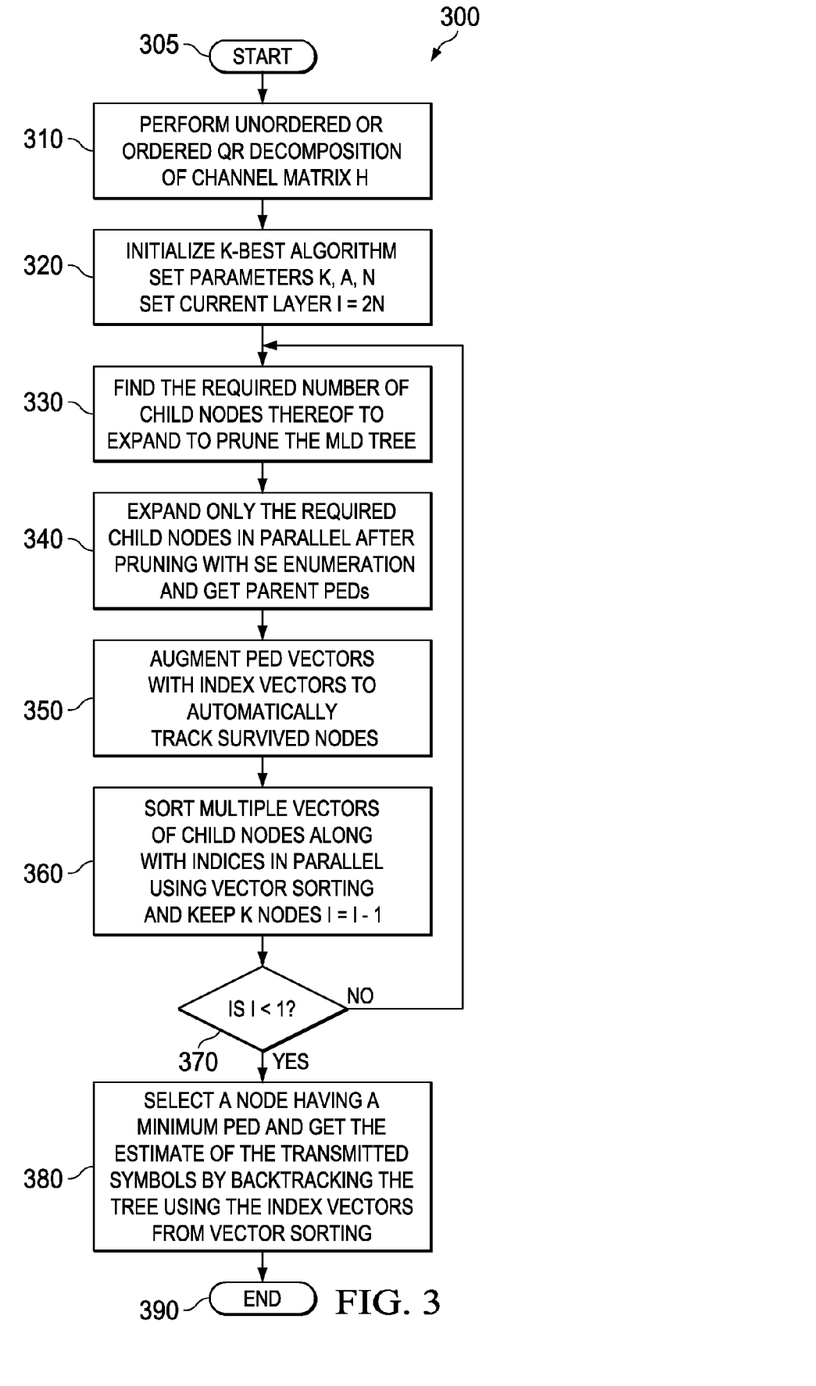
FIG. 3 is a flow diagram of an embodiment of a method of detecting a transmitted symbol from a received symbol carried out according to the principles of the present disclosure.

FIG. 3 is a flow diagram of an embodiment of a method 300 of detecting a transmitted symbol from a received symbol in a MIMO communications system carried out according to the principles of the present disclosure. The method 300 may be performed by a signal decoder such as the signal decoder 134 of FIG. 1. The signal decoder may be implemented employing a SIMD engine. Alternatively, the signal decoder may be implemented employing another type of computing device, such as, a computing device having multiple DSP cores. The method 300 can provide a pseudo-ML solution locating a node with the minimum PED among leaf nodes. The method 300 begins in a step 305.

In a step 310, unordered or ordered QR decomposition of channel matrix H is performed. A K-Best algorithm is initialized in a step 320. In initializing the K-Best algorithm, parameters K, A and N are set and a current layer set as I=2N.

The required number of child nodes to expand to prune the MLD tree are then determined in a step 330. The required child nodes are then expanded in parallel in a step 340 to obtain parent PEDs. The required child nodes are expanded after pruning with SE enumeration. Only the required child nodes are expanded.

In a step 350, PED vectors are augmented with index vectors to automatically track survived nodes. Multiple vectors of the child nodes are then sorted along with indices in parallel using vector sorting in a step 360. With the sorting, K number of nodes are kept and I is set to I−1 (i.e., I=I−1). A determination is then made in a decisional step 370 if I is less than 1. If not, then the method 300 proceeds to step 330 and continues. If it is, then the method 300 proceeds to step 380 where a node having a minimum PED is selected and an estimate of the transmitted symbols are obtained by backtracking the tree using the index vectors from vector sorting. The method 300 then ends in a step 390.

Those skilled in the art to which this application relates will appreciate that other and further additions, deletions, substitutions and modifications may be made to the described embodiments.

What is claimed is:

1. A signal decoder configured to estimate transmitted radio signals from a plurality of received radio signals, said signal decoder comprising:
an in-advance tree pruner configured to reduce a number of child nodes of a Maximum Likelihood Detector (MLD) tree to expand in parallel based on properties of Schnorr-Euchner enumeration and modulation properties of said received radio signals; and
a vector sorter configured to sort multiple rows of said reduced number of child nodes of said MLD tree in parallel.

2. The signal decoder as recited in claim 1 wherein said vector sorter is further configured to employ an index to track nodes of said MLD tree during sorting of said child nodes.

3. The signal decoder as recited in claim 1 wherein said tree pruner is configured to expand only said reduced number of said child nodes.

4. The signal decoder as recited in claim 1 wherein said signal decoder employs a modified K-Best algorithm to search said MLD tree.

5. The signal decoder as recited in claim 1 wherein said modulation properties include decision feedback equalization.

6. The signal decoder as recited in claim 1 wherein said vector sorter is configured to sort said child nodes in parallel by comparing and exchanging each element of said rows of child nodes in parallel.

7. The signal decoder as recited in claim 6 wherein said vector sorter is further configured to rotate at least one of said rows after said comparing and exchanging.

8. A method of detecting received radio signals at a multiple-input and multiple-output (MIMO) receiver, comprising:
generating at least part of a Maximum Likelihood Detector (MLD) tree for detecting a radio frequency signal at said MIMO receiver;
pruning said MLD tree to reduce a number of nodes thereof to expand based on modulation properties of said radio frequency signal and Schnorr-Euchner enumeration of said MLD tree;
sorting multiple rows of child nodes of said MLD tree in parallel; and
selecting a node of said MLD tree having a minimum Partial Euclidean Distance as an estimate of said radio frequency signal.

9. The method as recited in claim 8 further comprising indexing said multiple rows during said sorting.

10. The method as recited in claim 8 further comprising expanding said number of nodes in parallel after said pruning.

11. The method as recited in claim 8 further comprising employing a modified K-Best algorithm to search said MLD tree.

12. The method as recited in claim 8 wherein said modulation properties include decision feedback equalization.

13. The method as recited in claim 8 wherein said sorting in parallel includes comparing and exchanging each element of said rows of child nodes in parallel.

14. The method as recited in claim 13 wherein said sorting in parallel further comprises rotating at least one of said rows after said comparing and exchanging.

15. A multiple-input and multiple-output (MIMO) receiver, comprising:
a plurality of antennas configured to receive a plurality of received radio signals;
a signal decoder configured to estimate transmitted radio signals from said plurality of received radio signals, said signal decoder including:
an in-advance tree pruner configured to reduce a number of child nodes of a Maximum Likelihood Detector (MLD) tree to expand in parallel based on properties of Schnorr-Euchner enumeration and modulation properties of said received radio signals; and a vector sorter configured to sort multiple rows of said child nodes of said MLD tree in parallel.

16. The MIMO receiver as recited in claim 15 wherein said vector sorter is further configured to employ an index to track nodes of said MLD tree during sorting of said child nodes.

17. The MIMO receiver as recited in claim 15 wherein said tree pruner is configured to expand only said reduced number of said child nodes.

18. The MIMO receiver as recited in claim 15 wherein said signal decoder employs a K-Best algorithm to estimate said transmitted radio signals.

19. The MIMO receiver as recited in claim 15 wherein said modulation properties are Rayleigh Fading and decision feedback equalization.

20. The MIMO receiver as recited in claim 15 wherein said vector sorter is configured to sort said child nodes in parallel by comparing and exchanging each element of said rows of child nodes in parallel.

21. The MIMO receiver as recited in claim 20 wherein said vector sorter is further configured to rotate at least one of said rows to after said comparing and exchanging.

* * * * *